United States Patent
Lee et al.

(10) Patent No.: US 8,964,643 B2
(45) Date of Patent: Feb. 24, 2015

(54) REDIRECTION IN HETEROGENEOUS OVERLAY NETWORKS

(71) Applicant: KT Corporation, Gyeonggi-do (KR)

(72) Inventors: Ki-Ho Lee, Gyeonggi-do (KR); Yong-Gyoo Lee, Seoul (KR); Yung-Ha Ji, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 174 days.

(21) Appl. No.: 13/660,988

(22) Filed: Oct. 25, 2012

(65) Prior Publication Data

US 2013/0107821 A1    May 2, 2013

(30) Foreign Application Priority Data

Oct. 26, 2011   (KR) .................. 10-2011-0110113

(51) Int. Cl.
*H04W 4/00* (2009.01)
*H04W 48/18* (2009.01)

(52) U.S. Cl.
CPC .................... *H04W 48/18* (2013.01)
USPC .......................................................... 370/328

(58) Field of Classification Search
CPC ..................................................... H04W 48/18
USPC .............................. 370/329, 328, 331
See application file for complete search history.

(56) References Cited

U.S. PATENT DOCUMENTS

| | | | |
|---|---|---|---|
| 5,864,760 A | 1/1999 | Gilhousen et al. | |
| 6,081,714 A | 6/2000 | Wakizaka | |
| 6,466,790 B2 | 10/2002 | Haumont et al. | |
| 6,526,028 B1 | 2/2003 | Kondo | |
| 6,728,919 B1 | 4/2004 | Kondo et al. | |
| 6,845,238 B1 | 1/2005 | Muller | |
| 6,975,604 B1 | 12/2005 | Ishida et al. | |
| 7,072,655 B2 | 7/2006 | Ikeda et al. | |
| 7,200,403 B2 | 4/2007 | Hamabe | |
| 7,796,514 B2 | 9/2010 | Noriega | |
| 8,045,926 B2 | 10/2011 | Martikkala et al. | |
| 8,149,895 B2 | 4/2012 | Bolourchi et al. | |
| 8,165,089 B2 | 4/2012 | Jung et al. | |
| 8,379,567 B2 | 2/2013 | Cho et al. | |

(Continued)

FOREIGN PATENT DOCUMENTS

KR       10-0304781 B1      9/2001
KR   10-2005-0068400 A     7/2005

(Continued)

OTHER PUBLICATIONS

ETSI TS 123 272 V8.1.0, "Digital cellular telecommunications system (Phase 2+); Universal Mobile Telecommunications System (UMTS); Circuit Switched (CS) fallback in Evolved Packet System (EPS); Stage 2", ETSI, Nov. 2008, pp. 1-47.

(Continued)

*Primary Examiner* — Gary Mui
(74) *Attorney, Agent, or Firm* — IP Legal Services, LLC

(57) ABSTRACT

The disclosure is related to distributing a network load in overlay heterogeneous networks. A call connection request may receive from user equipment. A user preferred network may be identified based on predetermined network access priority information associated with the user equipment. Network redirection may be determined based on the user preferred network. Network redirection information may be created based on the determined network redirection.

20 Claims, 9 Drawing Sheets

(56) References Cited

U.S. PATENT DOCUMENTS

| | | |
|---|---|---|
| 8,406,193 B2 | 3/2013 | Cho et al. |
| 8,446,869 B2 | 5/2013 | Lee et al. |
| 8,472,921 B2 | 6/2013 | Yang et al. |
| 8,509,783 B2 | 8/2013 | Iwamura |
| 2001/0011019 A1 | 8/2001 | Jokimies |
| 2004/0203926 A1 | 10/2004 | Ruutu et al. |
| 2004/0235510 A1 | 11/2004 | Elicegui et al. |
| 2005/0048980 A1 | 3/2005 | Kumar et al. |
| 2005/0249322 A1 | 11/2005 | Gerlach |
| 2006/0092872 A1 | 5/2006 | Lee et al. |
| 2006/0178153 A1 | 8/2006 | Tenny et al. |
| 2007/0087689 A1 | 4/2007 | Alles et al. |
| 2007/0184841 A1 | 8/2007 | Choi et al. |
| 2008/0139204 A1 | 6/2008 | Hsieh et al. |
| 2008/0199183 A1 | 8/2008 | Liu et al. |
| 2008/0219222 A1 | 9/2008 | Lo et al. |
| 2009/0135778 A1 | 5/2009 | Lee et al. |
| 2009/0238143 A1 | 9/2009 | Mukherjee et al. |
| 2009/0310568 A1 | 12/2009 | Chen et al. |
| 2010/0008324 A1 | 1/2010 | Lee et al. |
| 2010/0015978 A1 | 1/2010 | Yoon et al. |
| 2010/0075679 A1 | 3/2010 | Tenny et al. |
| 2010/0113032 A1 | 5/2010 | Lee et al. |
| 2010/0136979 A1 | 6/2010 | Yang et al. |
| 2010/0144334 A1 | 6/2010 | Gorokhov et al. |
| 2010/0178916 A1 | 7/2010 | Jamadagni |
| 2010/0216474 A1 | 8/2010 | Park et al. |
| 2010/0273485 A1 | 10/2010 | Huang et al. |
| 2010/0278146 A1* | 11/2010 | Aoyama et al. ............... 370/331 |
| 2010/0278150 A1 | 11/2010 | Park et al. |
| 2011/0013560 A1 | 1/2011 | Zhang et al. |
| 2011/0016214 A1 | 1/2011 | Jackson |
| 2011/0022812 A1 | 1/2011 | van der Linden et al. |
| 2011/0092214 A1 | 4/2011 | Iwamura |
| 2011/0176477 A1 | 7/2011 | Lee et al. |
| 2011/0176485 A1 | 7/2011 | Pudney et al. |
| 2011/0207459 A1* | 8/2011 | Ramasamy et al. .......... 455/436 |
| 2011/0237272 A1 | 9/2011 | Gorokhov et al. |
| 2011/0274040 A1* | 11/2011 | Pani et al. ..................... 370/328 |
| 2011/0312355 A1 | 12/2011 | Cheng et al. |
| 2012/0039216 A1 | 2/2012 | Li et al. |
| 2012/0221683 A1 | 8/2012 | Ferris |
| 2012/0322477 A1 | 12/2012 | Kang et al. |
| 2013/0089021 A1 | 4/2013 | Gaal et al. |
| 2013/0103844 A1 | 4/2013 | Bulut et al. |
| 2013/0163416 A1 | 6/2013 | Lee et al. |
| 2013/0242951 A1 | 9/2013 | Lee et al. |
| 2014/0052864 A1 | 2/2014 | Van Der Linden et al. |

FOREIGN PATENT DOCUMENTS

| | | |
|---|---|---|
| KR | 10-2005-0121136 A | 12/2005 |
| KR | 10-2006-0016016 A | 2/2006 |
| KR | 10-2006-0040237 A | 5/2006 |
| KR | 10-2007-0079633 A | 8/2007 |
| KR | 10-2007-0110348 A | 11/2007 |
| KR | 10-2008-0026855 A | 3/2008 |
| KR | 10-2008-0041543 A | 5/2008 |
| KR | 10-2008-0041545 A | 5/2008 |
| KR | 10-2008-0064691 A | 7/2008 |
| KR | 10-2008-0080801 A | 9/2008 |
| KR | 10-0873386 B1 | 12/2008 |
| KR | 10-2009-0034261 A | 4/2009 |
| KR | 10-2009-0073443 A | 7/2009 |
| KR | 10-0920894 B1 | 10/2009 |
| KR | 10-2010-0003664 A | 1/2010 |
| KR | 10-2010-0004833 A | 1/2010 |
| KR | 10-2010-0021156 A | 2/2010 |
| KR | 10-2010-0029869 A | 3/2010 |
| KR | 10-2010-0035088 A | 4/2010 |
| KR | 10-2010-0048841 A | 5/2010 |
| KR | 10-2010-0060353 A | 6/2010 |
| KR | 10-2010-0066875 A | 6/2010 |
| KR | 10-2010-0087382 A | 8/2010 |
| KR | 10-2010-0092742 A | 8/2010 |
| KR | 10-0976943 B1 | 8/2010 |
| KR | 10-2010-0126776 A | 12/2010 |
| KR | 10-2010-0126818 A | 12/2010 |
| KR | 10-2010-0133821 A | 12/2010 |
| KR | 10-1030897 B1 | 4/2011 |
| KR | 10-2011-0094140 A | 8/2011 |
| KR | 10-2011-0097702 A | 8/2011 |
| KR | 10-2011-0099327 A | 9/2011 |
| WO | 2008/110924 A2 | 9/2008 |
| WO | 2010/068769 A1 | 6/2010 |
| WO | 2010/123270 A2 | 10/2010 |
| WO | 2010/127365 A1 | 11/2010 |
| WO | 2011/022733 A2 | 2/2011 |

OTHER PUBLICATIONS

Ralf Irmer et al., "Coordinated multipoint: Concepts, Performance, and Field Trial Results", IEEE Communications Magazine, Feb. 2011, pp. 102-111, vol. 49, Issue 2.

\* cited by examiner

REDIRECTION IN HETEROGENEOUS OVERLAY NETWORKS

CROSS REFERENCE TO PRIOR APPLICATIONS

The present application claims priority under 35 U.S.C. §119 to Korean Patent Application No. 10-2011-0110113 (filed on Oct. 26, 2011), which is hereby incorporated by reference in its entirety.

The subject matter of this application is related to U.S. patent application Ser. No. 13/661,004 filed on Oct. 25, 2012, the teachings of which are incorporated herein their entirety by reference.

FIELD OF THE INVENTION

The present invention relates to communication and, in particular, to redirecting user equipment between heterogeneous overlay networks based on a predetermined priority.

BACKGROUND OF THE INVENTION

Evolved Universal Mobile Telecommunication System Terrestrial Radio Access Network (E-UTRAN), also known as Long Term Evolution (LTE) network, delivers information at a high data transmit rate with low latency. Such an E-UTRAN has been built over a UMTS terrestrial radio access network (UTRAN), also known as wideband code division multiple access network (WCDMA). For example, E-UTRAN cells may be overlaid on UTRAN cells.

User equipment may have poor reception signal quality due to many reasons. For example, when user equipment is located at an edge of one E-UTRAN cell or when a serving base station of an E-UTRAN cell has large load, the user equipment may have poor reception signal quality. In this case, it might need to redirect the user equipment between heterogeneous networks, for example, the E-UTRAN to the UTRAN.

SUMMARY OF THE INVENTION

This summary is provided to introduce a selection of concepts in a simplified form that is further described below in the Detailed Description. This summary is not intended to identify key features or essential features of the claimed subject matter, nor is not intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, user equipment may be redirected between heterogeneous overlay networks for network load distribution.

In accordance with another aspect of the present invention, user equipment may be redirected between heterogeneous overlay network based on at least one of priorities respectively associated with user equipment, a network load, and accounting information.

In accordance with an embodiment of the present invention, a method may be provided for network redirection in overlay heterogeneous networks. The method may include receiving a call connection request from user equipment, identifying a user preferred network based on predetermined network access priority information associated with the user equipment, determining network redirection based on the user preferred network, and creating network redirection information based on the determined network redirection.

The method may further include obtaining the predetermined network access priority information from a mobility management entity.

The predetermined network access priority information may be included in a subscriber profile identifier (SPID).

The determining the network redirection may include determining that performing the network redirection is necessary when a current serving network is not the user preferred network, otherwise determining that performing the network redirection is unnecessary when the current serving network is the user preferred network.

The method may further include transmitting the created network redirection information to the user equipment.

In the transmitting, the created network redirection information may be transmitted using a radio resource control (RRC) connection release message.

The creating the network redirection information may include setting the user preferred network as a next serving network, setting a time limit for the determined network direction, and generating the network redirection information based on the next serving network and the time limit.

For the creating the network redirection information, the network redirection information may further include at least one of frequency allocation information and frequency allocation priority information. The frequency allocation information may include a frequency allocation for use in the next serving network. The frequency allocation priority information may include frequency allocation priority for a current serving network and the next serving network.

The determining the network redirection may be based on at least one of network load and accounting information.

The determining the network redirection may include determining whether a current serving network is the user preferred network, determining whether a network load of a next serving network has not reached a first reference value when the current serving network is not the user preferred network, determining that performing the network redirection is necessary when the network load has not reached the first reference value, and determining that performing the network redirection is unnecessary when at least one of the current serving network is the user preferred network and the network load reaches the first reference value.

The determining the network redirection may further include determining whether a load difference between the current serving network and the next serving network reaches a second reference value when the current serving network is the user preferred network, determining that performing the network redirection is necessary when the load difference reaches the second reference value, and determining that performing the network redirection is not necessary when the load difference has not reached the second reference value.

The determining the network redirection may further include determining whether an accounting balance for the current serving network reaches a reference balance when the load difference has not reached the second reference value, determining that performing the network redirection is necessary when the accounting balance has not reached the reference balance, and determining that performing the network redirection is unnecessary when the accounting balance reaches the reference balance.

In accordance with another embodiment of the present invention, a method may be provided for network redirection in overlay heterogeneous networks. The method may include receiving a call connection request from user equipment, determining availability of network redirection information associated with the user equipment, and performing a network redirection determination procedure when the network redirection information is unavailable.

The method may further include performing a network redirection determination procedure when the network redirection information is available and when a time limit included in the network redirection information is expired.

In accordance with still another embodiment of the present invention, a method may be provided for network redirection in overlay heterogeneous networks in user equipment. The method may include receiving network redirection information from a first base station when connection between the user equipment and a current serving network is released, and transmitting a call connection request message to a second base station for a new communication service based on the received network redirection information, wherein the received network redirection information indicates the second base station of a next serving network.

The network redirection information may include at least one of the next serving network, a redirection time limit, frequency allocation information to be used in the next serving network, and a frequency allocation priority information for each of a previous serving network and the next serving network.

In accordance with yet another embodiment of the present invention, an apparatus may be provided for network redirection in overlay heterogeneous networks. The apparatus may include a receiving unit and a redirection determination unit. The receiving unit may be configured to receive predetermined network access priority information associated with user equipment. The redirection determination unit may be configured to determine network redirection based on the predetermined network access priority information, and to create network redirection information based on the determined network redirection.

The apparatus may further include a transmitting unit. The transmitting unit may be configured to transmit the created network redirection information to the user equipment.

The redirection determination unit may be configured to determine whether the network redirection is necessary by further considering at least one of a network load and accounting information. The network redirection information may include at least one of a next serving network, a redirection time limit, a frequency allocation information to be used in the next serving network, and a frequency allocation priority information for each of a current serving network and the next serving network.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
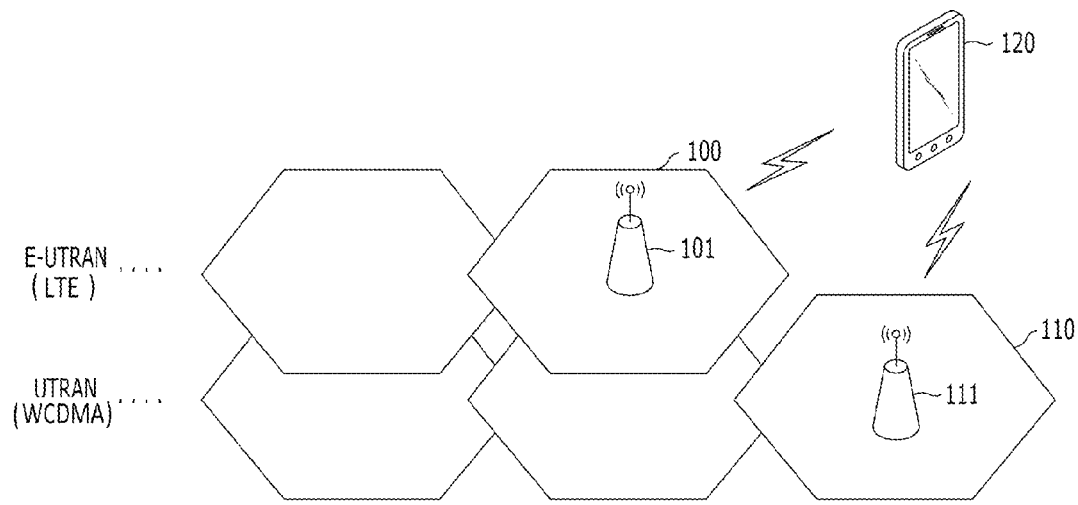
FIG. 1 illustrates typical heterogeneous overlay networks.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment of the present invention, user equipment may be redirected between heterogeneous overlay networks according to predetermined priorities when user equipment requests connection to a base station of one of the heterogeneous overlay networks. The heterogeneous overlay networks may be, for example, a LTE network and a WCDMA network. For convenience and ease of understanding, user equipment is described as being redirected from the LTE network to the WCDMA network based on predetermined priorities in accordance with at least one embodiment of the present invention. The present invention, however, is not limited thereto. User equipment may be redirected from the WCDMA network to the LTE network based on the predetermined priorities in accordance with another embodiment of the present invention. Such heterogeneous overlay network is described with reference to FIG. 1.

FIG. 1 illustrates typical heterogeneous overlay networks.

Referring to FIG. 1, the typical heterogeneous overlay networks may include a LTE network and a WCDMA network. As shown, two different types of networks are overlaid on each other. The LTE network is overlaid on the WCDMA network. The LTE network may include a plurality of LTE cells 100 each governed by corresponding evolved Node B (eNodeB) 101. The LTE network is also known as an E-UTRAN. Furthermore, the WCDMA network may include a plurality of WCDMA cells 110 each governed by corresponding NodeB 111. The WCDMA is also known as UTRAN.

In accordance with at least one embodiment of the present invention, user equipment may be redirected between the LTE network and the WCDMA network based on a predetermined network access priority when user equipment 120 requests connection to eNodeB 101. For example, when user equipment 120 enters a service area of eNodeB 101, which is LTE cell 100, user equipment 120 may request connection to eNodeB 101. Then, eNodeB 101 may determine whether it is necessary to redirect user equipment to WCDMA cell 110 based on predetermined network access priority. Such predetermined network access priority may be previously set to user equipment 120 and provided to base stations such as eNodeB 101 and/or NodeB 111. For example, the information on the predetermined network access priority may be provided through a context setup procedure. The context setup procedure may be initiated when user equipment 120 transmits a call connection request message to eNodeB 101. That is, eNodeB 101 may perform the context setup procedure performed in cooperation with a mobility management entity (MME) of the LTE network upon the receipt of the call connection request message. eNodeB 101 may obtain the information on the predetermined network access priority through the contact setup procedure in accordance with at least one embodiment of the present invention. Such operation will be described with reference to FIG. 2A and FIG. 2B.

Figure 2A:
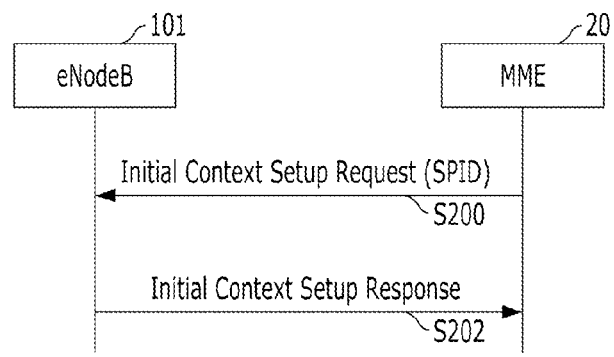
FIG. 2A and FIG. 2B illustrate performing an initial context setup in accordance with at least one embodiment of the present invention.
Figure 2B:
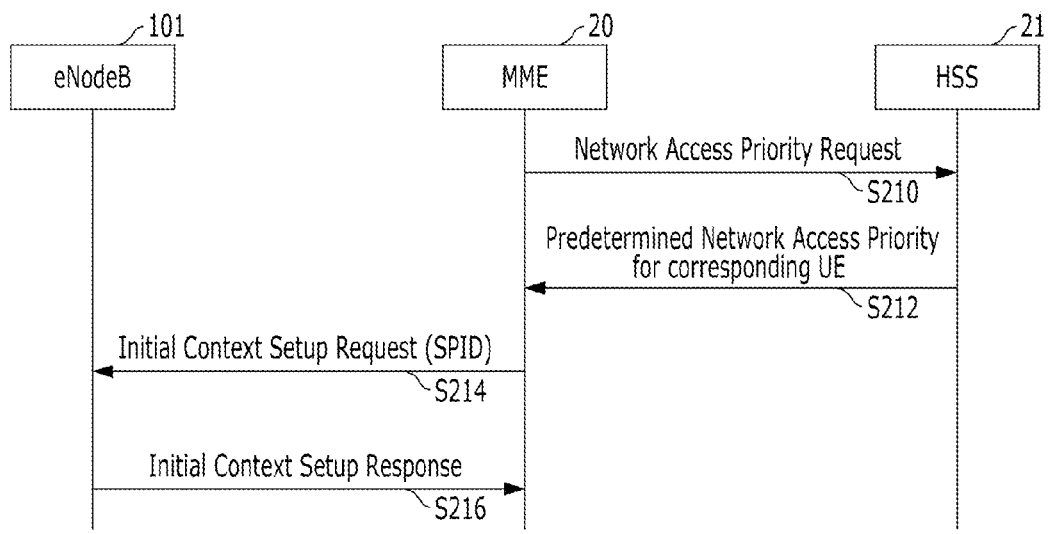

FIGS. 2A and 2B illustrate a method for performing an initial context setup in accordance with at least one embodiment of the present invention.

As described, eNodeB 101 receives a call connection request message from user equipment (UE) 120 and initiates an initial context setup procedure in response to the call connection request message. eNodeB 101 may perform the initial context setup procedure in cooperation with MME 20. MME 20 may be a node capable of performing a mobility management function, a handover control function, and a bearer management function.

Referring to FIG. 2A, when UE 120 transmits a call connection request to eNodeB 101, the initial context setup procedure is initiated. Upon the initiation of the initial context setup procedure, MME 20 may transmit an initial context setup request message to eNodeB 101 at step S200. Herein, the initial context setup request message may include a subscriber profile Identifier (SPID). Such a SPID may be used to provide a predetermined network access priority associated with UE 120 to eNodeB 101. For example, MME 20 may store network access priorities which are predetermined in association with respective user equipment. When the initial context setup procedure is initiated, MME 20 may provide a corresponding network access priority using the SPID in accordance with at least one embodiment of the present invention. Particularly, MME 20 may set up the SPID with two values each denoting different network access priority. In accordance with at least one embodiment of the present invention, the SPID may be set to "255" and "256", each denoting different network access priority as shown in Table 1 and Table 2 below. Table 1 shows a network access priority when SPID is set to "256." In case that SPID is "256," UE 120 may have a high priority to access E-UTRAN as shown in Table 1. In case that SPID is set to "255," UE 120 may have a high priority to access UTRAN as shown in Table 2 below.

TABLE 1

(SPID = 256)

| Configuration Parameter | Value | Meaning |
| --- | --- | --- |
| E-UTRAN carriers priority | high | The priorities for selecting all E-UTRAN carriers in idle and connected mode are higher than the priorities for selecting all UTRAN and GERAN carriers. |
| UTRAN carriers priority | low | The priorities for selecting all UTRAN carriers in idle and connected modes are lower than the priorities for selecting all E-UTRAN and higher than the priorities for selecting all GERAN carriers. |

TABLE 2

(SPID = 255)

| Configuration Parameter | Value | Meaning |
| --- | --- | --- |
| UTRAN carriers priority | high | The priorities for selecting all UTRAN carriers in idle and connected mode are higher than the priorities for selecting all E-UTRAN carriers. |
| E-UTRAN carriers priority | low | The priorities for selecting all E-UTRAN carriers in idle and connected mode are lower than the priorities for selecting all UTRAN carriers. |

At step S202, eNodeB 101 receives the context setup request message from MME 20 and transmit an initial context setup response message to MME 20.

In accordance with another embodiment of the present invention, Home Subscriber Server (HSS) 21 may store network access priorities which are predetermined in association with respective user equipment. That is, HSS 21 may contain the predetermined network access priorities associated with user equipment as well as users' subscription data such as a QoS profile. HSS 21 may provide such information to MME 20 in response to a predetermined request, as shown in FIG. 2B.

Referring to FIG. 2B, before initiating the initial context setup procedure, MME 20 may request a network access priority associated with UE 120 by transmitting a network access priority request message to HSS 21 at step S210. At step S212, HSS 21 may receive the network access priority request message from MME 20, retrieve information on a corresponding network assess priority associated with UE 120, and transmit the retrieved network access priority information to MME 20. Thereafter, such retrieved network access priority information may be provided through the initial context setup procedure. That is, MME 20 may set up a SPID based on the received network access priority information, generate an initial context setup request message including the SPID, and transmit the initial context setup request message to eNodeB 101 at step S214. eNodeB 101 may receive the network access priority information through the initial context setup request message and transmit an initial context setup response message to MME 20 at step S216. The network access priority information may be used to determine whether to redirect user equipment between heterogeneous overpay networks in accordance with at least one embodiment of the present invention. Such operation will be described with reference to FIG. 3.

Figure 3:
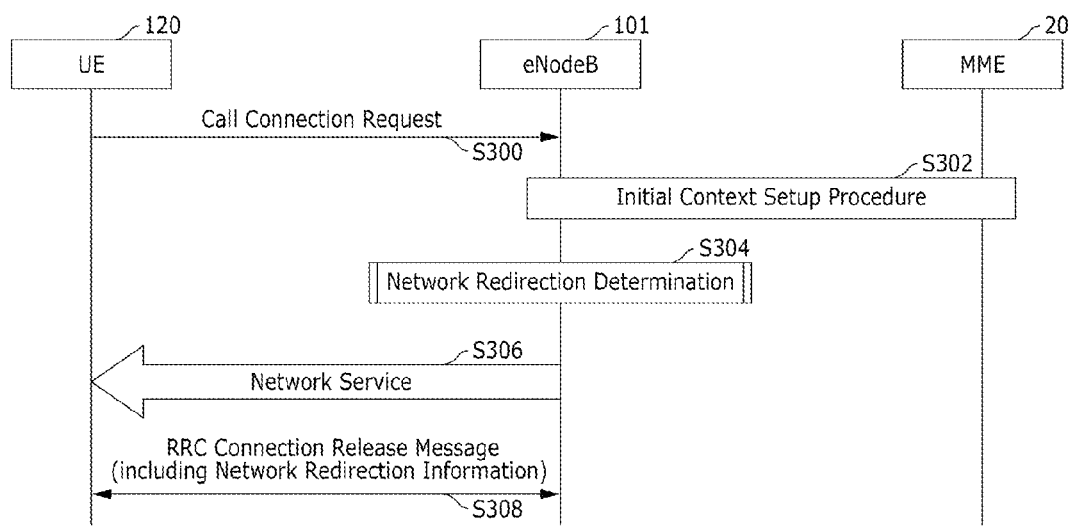
FIG. 3 illustrates redirecting user equipment in heterogeneous overlay networks in accordance with at least one embodiment of the present invention.

FIG. 3 illustrates redirecting user equipment in heterogeneous overlay networks in accordance with at least one embodiment of the present invention.

Referring to FIG. 3, user equipment 120 may enter a service area (LTE cell) of eNodeB 101 and transmit a call connection request message to eNodeB 101 in order to establish connection thereto at step S300. Upon the receipt of the call connection request message, eNodeB 101 may initiate an initial context setup procedure in cooperation with MME 20 at step S302. Since the initial context setup procedure was already described with reference to FIG. 2A and FIG. 2B, the detailed description thereof is omitted herein. During the initial context setup procedure, MME 20 may transmit an initial context setup response including SPID to eNodeB 101.

The SPID may include information on a predetermined network access priority associated with UE 120. For example, the SPID may have a value denoting the predetermined network access priority associated with UE 120 as shown in FIG. 2A. The present invention, however, is not limited thereto. In accordance with another embodiment of the present invention, MME 20 may receive information on a predetermined network access priority associated with UE 120 from HSS 21 and transmit the received network access priority information to eNodeB 101, as described in FIG. 2B.

At step S304, eNodeB 101 may perform a network redirection determination procedure. Particularly, eNodeB 101 may determine whether network redirection is necessary based on various factors, for example, predetermined network access priorities associated with respective user equipment, network load, and accounting information. The network redirection determination procedure will be described in more detail with reference to FIG. 5 to FIG. 7.

At step S306, eNodeB 101 may provide a network service to UE 120. For example, eNodeB 101 may provide a requested service such as a network service and a communication service regardless of the determination result in accordance with at least one embodiment of the present invention. Particularly, eNodeB 101 may provide a requested service when eNodeB 101 determines that the network redirection is not necessary. In this case, eNodeB 101 may enable user equipment 120 to access the same network, for example, the LTE network, for the next service. When eNodeB 101 determines that the network redirection necessary, eNodeB 101 may provide a requested service to user equipment 120. However, eNodeB 101 may enable user equipment 120 to access the other network, for example, the WCDMA network, for the next service.

At step S308, eNodeB 101 may transmit a radio resource control (RRC) connection release message to UE 120. For example, after providing the requested service, eNodeB 101 may release connection between UE 120 and the current serving network such as the LTE network. When eNodeB 101 releases the connection, eNodeB 101 may include network redirection information in the RRC connection release message and transmit the RRC connection release message to UE 120. For example, the network redirection information may include information on a next serving network and a time limit. The information on a next serving network may be information on a preferred access network for UE 120. The preferred access network may have a comparatively high priority associated with UE 120. Furthermore, the network redirection information may include frequency allocation (FA) information and frequency allocation priority information. The FA information may include information on a FA to be used by UE 120 in the next serving network. The FA priority information may include information on priorities of FAs of a current serving network and the next serving network.

Table 3 below shows the RRC connection release message including the network redirection information may. As shown, the RRC connection release message may include "RedirectedCarrier Info" and "idleModeMobilityControlinfo" in order to include the network redirection information.

TABLE 3

| | | |
|---|---|---|
| RRCConnectionRelease-r8-IEs ::= | SEQUENCE { | |
| releaseCause | ReleaseCause, | |
| redirectedCarrierInfo | RedirectedCarrierInfo | OPTIONAL, -- |
| Need ON | | |
| idleModeMobilityControlInfo | IdleModeMobilityControlInfo | OPTIONAL, -- |
| Need OP | | |
| nonCriticalExtension | RRCConnectionRelease-v890-IEs | OPTIONAL |
| } | | |

For example, "RedirectedCarrier Info" may indicate a FA to be used in a UTRAN, next serving network, when UE 120 has a comparatively high priority to access the UTRAN (e.g., SPID="255"). For example, "RedirectedCarrier Info" included in the RRC connection release message may be set to indicate a next serving network, as described in Table 4 below.

TABLE 4

| | |
|---|---|
| RedirectedCarrierInfo ::= | CHOICE { |
| utra-FDD | ARFCN-ValueUTRA, |
| } | |

For example, a variable "utra-FDD" may indicate FAs available for a related network. When about 2.1 GHz and about 900 MHz are available as FAs, the variable "utra-FDD" may be set as one of about 2.1 GHz and about 900 MHz. The variable "AFRCN-ValueUTRA" may include a value indicating one of about 2.1 GHz and about 900 MHz. After a FA to be used for the next serving network is decided, the variable "AFRCN-ValueUTRA" is set accordingly. "AFRCN-ValueUTRA" may stand for "Absolute Radio Frequency Channel Number (ARFCN)-ValueUTRA." In accordance with at least one embodiment of the present invention, the variable "ARFCN-ValueUTRA" may be determined according to a frequency allocation technique for load distribution.

Meanwhile, "idleModeMobilityControlinfo" may indicate the FA priority information. Such FA priority information might be necessary for UE 120 in an idle status when UE 120 has a high priority to access a UTRAN. In this case, SPID might have a value of "255". For example, "idleModeMobilityControlinfo" included in the RRC connection release message may be set as described in Table 5 below.

TABLE 5

| | | |
|---|---|---|
| IdleModeMobilityControlInfo ::= | SEQUENCE { | |
| freqPriorityListEUTRA | FreqPriorityListEUTRA | OPTIONAL, -- |
| Need ON | | |
| freqPriorityListUTRA-FDD | FreqPriorityListUTRA-FDD | OPTIONAL, -- |

TABLE 5-continued

```
Need ON
      t320                       ENUMERATED {
                                    min5, min10, min20, min30, min60, min120, min180,
                             spare1}                              OPTIONAL, --
Need OR
         ...
}
FreqPriorityListEUTRA ::=       SEQUENCE (SIZE (1..maxFreq)) OF FreqPriorityEUTRA
FreqPriorityEUTRA ::=           SEQUENCE {
         carrierFreq                ARFCN-ValueEUTRA,
         cellReselectionPriority    CellReselectionPriority
}
FreqPriorityListUTRA-FDD ::=    SEQUENCE (SIZE (1..maxUTRA-FDD-Carrier)) OF
FreqPriorityUTRA-FDD
FreqPriorityUTRA-FDD ::=        SEQUENCE {
         carrierFreq                ARFCN-ValueUTRA,
         cellReselectionPriority    CellReselectionPriority
}
```

As described, the variable "idleModeMobilityControlinfo" may include FA priority information for a UTRAN and an E-UTRAN. When UE 120 has a high priority to access the UTRAN (e.g., SPID is set as "255"), a FA priority for the UTRAN may be set to be higher than that for the E-UTRAN.

Figure 4:
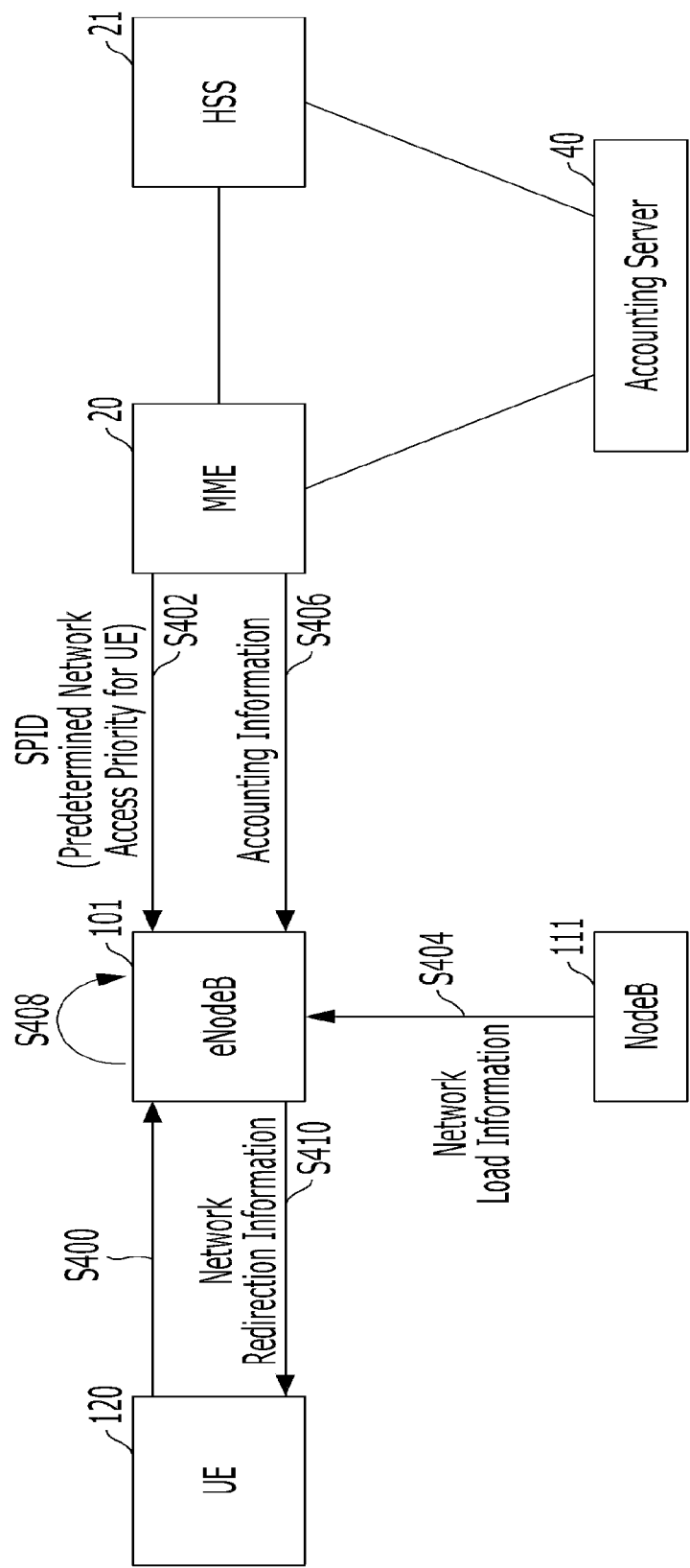
FIG. 4 illustrates obtaining necessary information for a network redirection determination in accordance with at least one embodiment of the present invention.

FIG. 4 illustrates obtaining necessary information for a network redirection determination in accordance with at least one embodiment of the present invention.

Referring to FIG. 4, eNodeB 101 receives a call connection request message from UE 120 at step S400. Upon the receipt of the call connection request message, an initial context setup procedure may be performed between eNodeB 101 and MME 20. At step S402, eNodeB 101 may receive an initial context setup response message including a SPID from MME 20. The SPID may include a predetermined network access priority associated with UE 120. The present invention, however, is not limited thereto. In accordance with another embodiment according to the present invention, MME 20 may receive a predetermined network access priority associated with UE 120 from HSS 21 and transmit the received network access priority to eNodeB 101.

At step S404, eNodeB 101 may receive network load information of the UTRAN from NodeB 111. eNodeB 101 of the E-UTRAN may periodically exchange network load information with NodeB 111 of the UTRAN. That is, eNodeB 101 and NodeB 111 may periodically transmit/receive their network load at the same time or at different time. The network load information may be exchanged between eNodeB 101 and NodeB 111 whenever there is a request from a counterpart base station. The network load information may be exchanged through a backbone network.

Accounting server 40 may store and manage accounting information associated with respective user equipment. MME 20 may obtain accounting information associated with UE 120, in interworking with accounting server 40. MME 20 may transmit the obtained accounting information to eNodeB 101 at step S406. The present invention, however, is not limited thereto. In accordance with another embodiment of the present invention, HSS 21 may obtain accounting information associated with UE 120 in interworking with accounting server 40. HSS 21 may transmit the obtained accounting information to MME 20.

At step S408, eNodeB 101 may perform a network redirection determination procedure based on information which is acquired at the steps S402, S404, and S406. That is, eNodeB 101 may determine whether network redirection is necessary based on a predetermined network access priority, network loads, and/or accounting information. The network redirection determination procedure will be described in more detail with reference to FIG. 5 to FIG. 7.

Thereafter, at step S410, eNodeB 101 may transmit a radio resource control (RRC) connection release message to UE 120. Herein, the RRC connection release message may include network redirection information which is determined at step S408 in associated with UE 120.

As described, the predetermined network access priority information, the network load information, and the accounting information may be obtained for the network redirection determination procedure. Heterogeneous overlay networks may include an E-UTRAN and a UTRAN. According to the network redirection determination procedure, user equipment may be redirected from one network to the other in the heterogeneous overlay networks. For example, based on the result of the network redirection determination procedure, user equipment may be redirected from the E-UTRAN to the UTRAN for the next service. The E-UTRAN may be a current serving network, also referred to as a first network. The UTRAN may be a next serving network, also referred to as a second network. Hereinafter, such network redirection determination procedure will be described with reference to FIG. 5.

Figure 5:
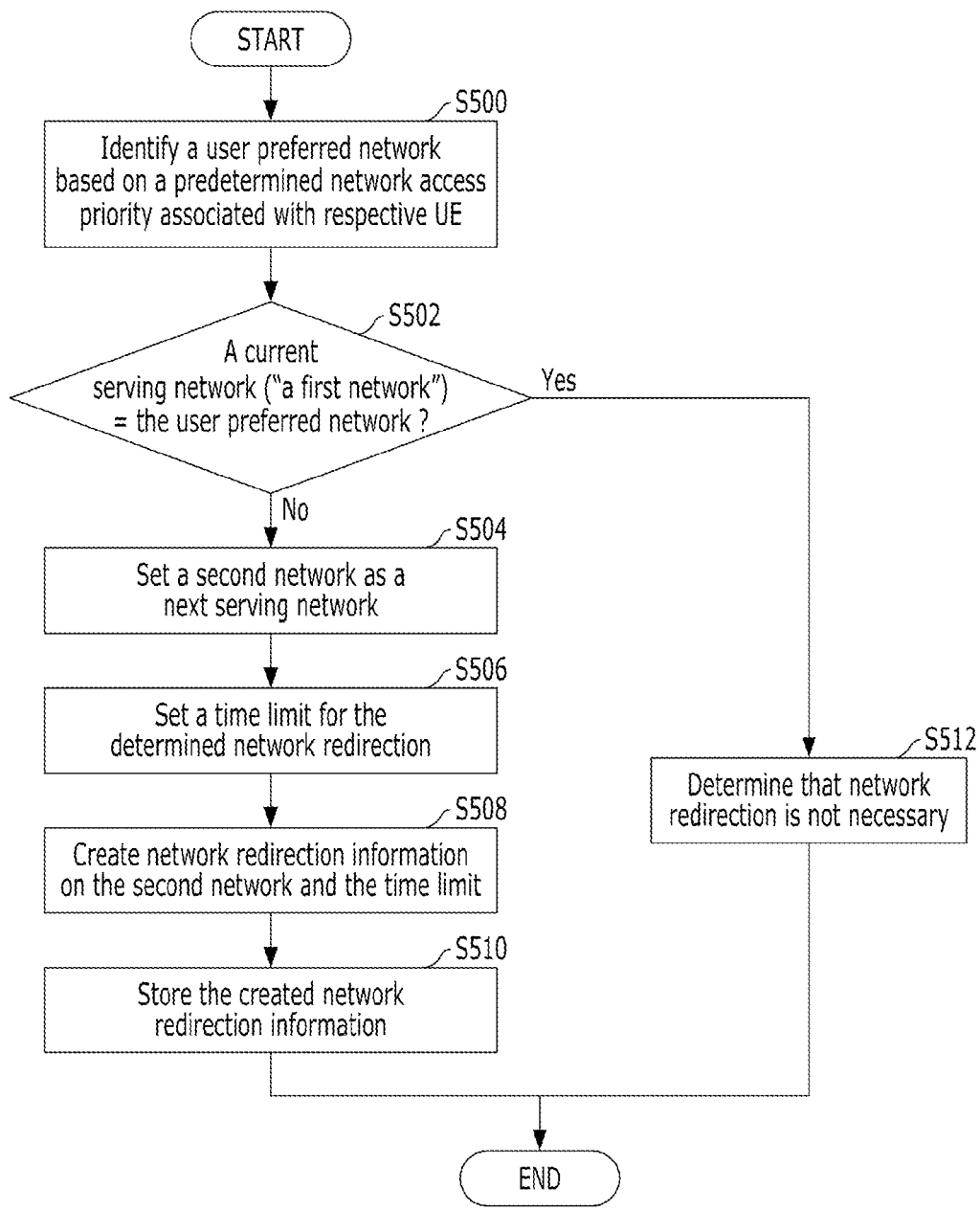
FIG. 5 illustrates determining whether network redirection is necessary based on a predetermined network access priority in accordance with at least one embodiment of the present invention.

FIG. 5 illustrates determining whether network redirection is necessary based on a predetermined network access priority in accordance with at least one embodiment of the present invention.

Referring to FIG. 5, when UE 120 transmits a call connection request to eNodeB 101 of E-UTRAN, eNodeB 101 may identify a user preferred network based on a predetermined network access priority associated with UE 120 at step S500.

At step S502, eNodeB 101 may determine whether a current serving network, referred to as a first network, is the user preferred network. For example, the current serving network may be an E-UTRAN.

When it is determined that the current serving network such as the E-UTRAN is the user preferred network (Yes—S502), eNodeB 101 may determine that network redirection is not necessary at step S512.

When it is determined that the current serving network such as the E-UTRAN is not the user preferred network (No—S502), eNodeB 101 may set a second network such as an UTRAN as a next serving network at step S504.

At step S506, eNodeB 101 may set a time limit for the determined network redirection. For example, the time limit may be set as 5, 10, 20, 30, 60, 120, or 180 minutes. The determined network redirection might be discarded after the time limit is expired. Further, the time limit may be set per each network cell.

At step S508, eNodeB 101 may create network redirection information to include the next (e.g., second) serving network and the time limit. The present invention, however, is not limited thereto. In accordance with another embodiment of the present invention, network redirection information may further include FA information to be used in the next serving network and FA priority information for the current serving network and the next serving network.

At step S510, eNodeB 101 may store the created network redirection information. The present invention, however, is not limited thereto. In accordance with another embodiment of the present invention, eNodeB 101 may transmit the created network redirection information to MME 20. MME 20 may store the received network redirection information. Furthermore, MME 20 may transmit the received network redirection information to HHS 21. HHS 21 might store and manage the received network redirection information.

In accordance with another embodiment of the present invention, eNodeB 101 may transmit the created network redirection information to a next serving base station, determined based on the network redirection determination procedure. For example, a corresponding base station of the next serving network may be NodeB 111. eNodeB 101 may transmit the created network redirection information to a mobility management entity (MME) of the next serving network.

Figure 6:
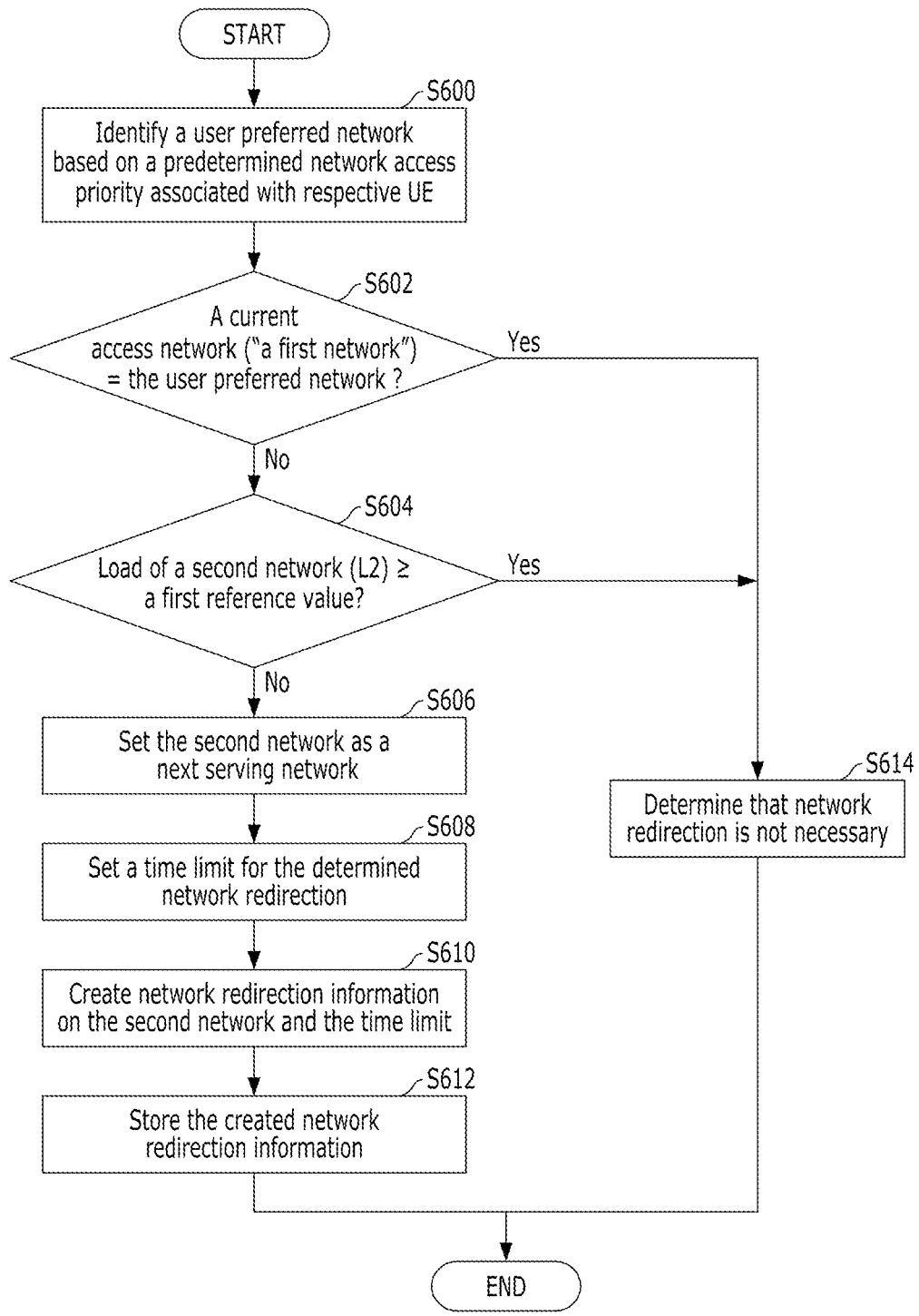
FIG. 6 illustrates determining whether network redirection is necessary based on a predetermined network access priority and a network load in accordance with at least one embodiment of the present invention.

FIG. 6 illustrates determining whether network redirection is necessary based on a predetermined network access priority and a network load in accordance with at least one embodiment of the present invention.

Referring to FIG. 6, when UE 120 transmits a call connection request to eNodeB 101 of an E-UTRAN, eNodeB 101 may identify a user preferred network based on a predetermined network access priority associated with respective UE at step S600.

At step S602, eNodeB 101 may determine whether a current serving network, also referred to as a first network, is the user preferred network.

When it is determined that the current serving network is the user preferred network such as the E-UTRAN (Yes—S602), eNodeB 101 may determine that network redirection is not necessary at step S614.

When it is determined that the current serving network is not the user preferred network such as a UTRAN (No—S602), eNodeB 101 may further determine whether a load of the UTRAN such as a second network load (L2) is greater than or equal to a first reference value at step S604.

When it is determined that the second network load (L2) is greater than or equal to a first reference value (Yes—S604), eNodeB 101 may determine that network redirection is not necessary at step S614. That is, although the UTRAN is the user preferred network, eNodeB 101 may determine that network redirection is not necessary when the second network load (L2), which is the network load of the UTRAN, is greater than or equal to the first reference value.

When it is determined that the second network load (L2) is less than the first reference value (No—S604), eNodeB 101 may set the user preferred network such as the UTRAN as a next serving network at step S606.

At step S608, eNodeB 101 may set a time limit for the determined network redirection. For example, the time limit may be set as 5, 10, 20, 30, 60, 120, or 180 minutes. The determined network redirection might be discarded after the time limit is expired. Further, the time limit may be set per each network cell.

At step S610 eNodeB 101 may create network redirection information on the next serving network and the time limit. The present invention, however, is not limited thereto. In accordance with another embodiment of the present invention, network redirection information may further include FA information to be used in the next serving network and FA priority information for the current serving network and the next serving network.

At step S612, eNodeB 101 may store the created network redirection information. The present invention, however, is not limited thereto. In accordance with another embodiment of the present invention, eNodeB 101 may transmit the created network redirection information to MME 20. MME 20 may store the received network redirection information. Furthermore, MME 20 may transmit the received network redirection information to HHS 21. HSS 21 might store and manage the received network redirection information.

In accordance with another embodiment of the present invention, eNodeB 101 may transmit the created network redirection information to a corresponding base station of the next serving network such as the UTRAN. In this case, the corresponding base station of the next serving network might be NodeB 111. eNodeB 101 may transmit the created network redirection information to a mobility management entity (MME) of the next serving network such as the UTRAB.

Figure 7:
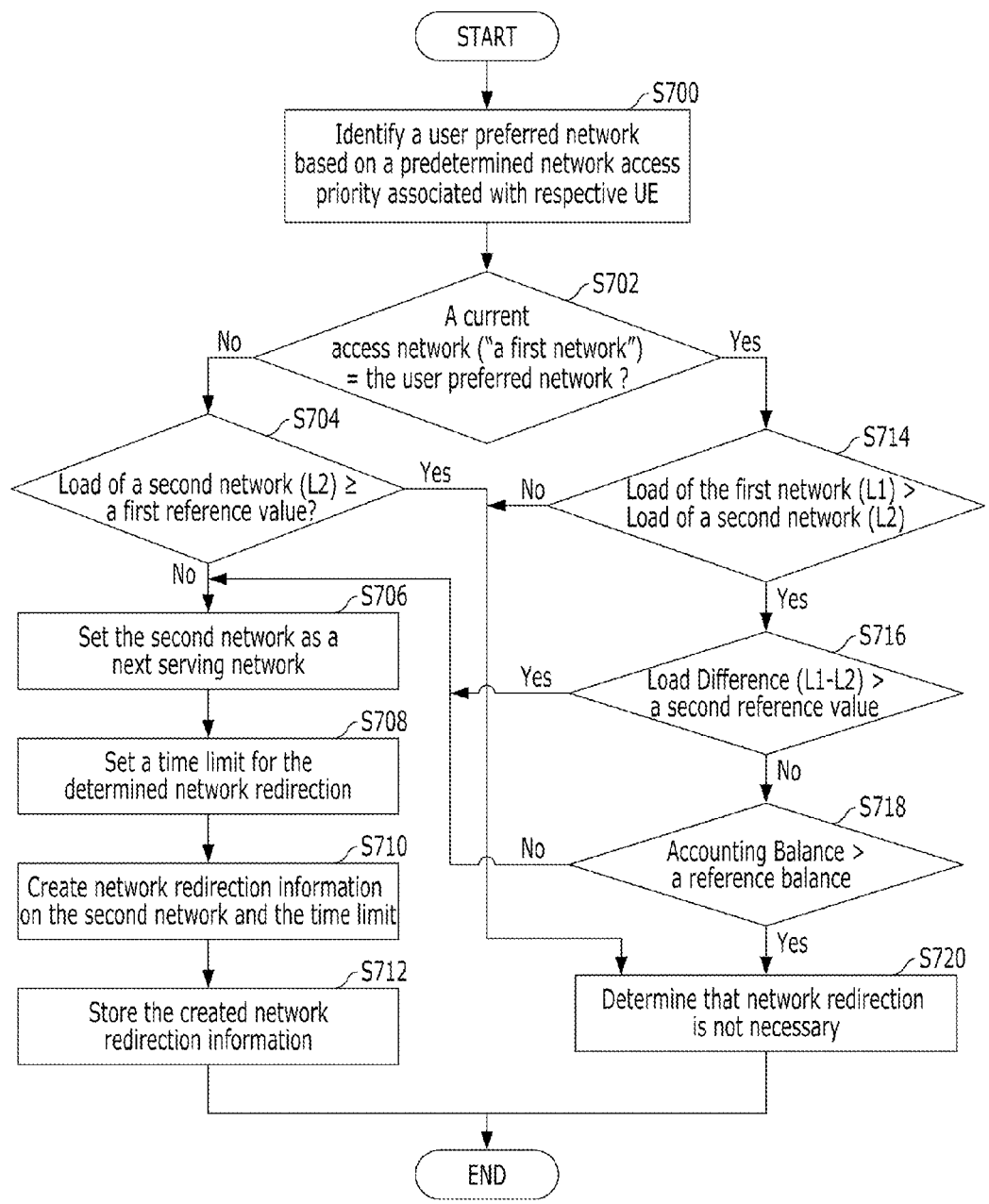
FIG. 7 illustrates determining whether network redirection is necessary based on a predetermined network access priority, network loads, and accounting information in accordance with at least one embodiment of the present invention.

FIG. 7 illustrates determining whether network redirection is necessary based on a predetermined network access priority, network loads, and accounting information in accordance with at least one embodiment of the present invention.

Referring to FIG. 7, when UE 120 transmits a call connection request to eNodeB 101 of E-UTRAN, eNodeB 101 may identify a user preferred network based on a predetermined network access priority associated with UE 120 at step S700.

At step S702, eNodeB 101 may determine whether a current serving network, referred to as a first network, is the user preferred network. Herein, the first network may be the E-UTRAN.

When it is determined that the current serving network such as the E-UTRAN is not the user preferred network (No—S702), eNodeB 101 may further determine whether a load of a second network, referred to as a second network load L2, is greater than or equal to a first reference value at step S704.

When it is determined that the second network load L2 is greater than or equal to a first reference value (Yes—S704), eNodeB 101 may determine that network redirection is not necessary at step S720.

When it is determined that the second network load L2 is less than the first reference value (No—S704), eNodeB 101 may set the second network such as a UTRAN as a next serving network at step S706.

At step S708, eNodeB 101 may set a time limit for the determined network redirection. For example, the time limit may be set as 5, 10, 20, 30, 60, 120, or 180 minutes. The determined network redirection might be discarded after the time limit is expired. Further, the time limit may be set per each network cell.

At step S710 eNodeB 101 may create network redirection information on the second network and the time limit. The present invention, however, is not limited thereto. In accordance with another embodiment of the present invention, network redirection information may further include frequency allocation information to be used in the next serving network and frequency allocation priority information for each of the current serving network and the next serving network.

At step S712, eNodeB 101 may store the created network redirection information. The present invention, however, is not limited thereto. In accordance with another embodiment of the present invention, eNodeB 101 may transmit the created network redirection information to MME 20. MME 20 may store the received network redirection information. Furthermore, MME 20 may transmit the received network redirection information to HHS 21. HHS 21 may store and manage the received network redirection information.

In addition, eNodeB 101 may transmit the created network redirection information to a corresponding base station to be redirected. For example, the corresponding base station of the next serving network might be NodeB 111. eNodeB 101 may transmit the created network redirection information to a mobility management node of the next serving network.

Meanwhile, when it is determined that the current serving network such as the E-UTRAN is the user preferred network (Yes—S702), eNodeB 101 may further determine whether a load of the first network ("first network load L1") is greater than a load of the second network ("second network load L2") at step S714.

When it is determined that the first network load L1 is smaller than or equal to the second network load L2 (No—S714), eNodeB 101 may determine that network redirection is not necessary at step S720.

When it is determined that the first network load L1 is greater than the second network load L2 (Yes—S714), eNodeB 101 may further determine whether a load difference (L1−L2) between the first network load L1 and the second network load L2 is greater than a second reference value at step S716.

When it is determined that the load difference (L1−L2) is greater than the second reference value (Yes—S716), eNodeB 101 may perform steps S706 to S712. That is, although the first network ("E-UTRAN") is the user preferred network, eNodeB 101 may determine that network redirection is necessary when the load difference (L1−L2) is greater than the second reference value.

When it is determined that the load difference (L1−L2) is smaller than or equal to the second reference value (No—S716), eNodeB 101 may further determine whether an accounting balance associated with UE 120 is greater than a reference balance at step S718. The reference balance may be set as zero ("0"). The accounting balance may be a credit amount available in an account associated with UE 120 for having a communication service from the first network such as the E-UTRAN.

When it is determined that the accounting balance is less than or equal to the reference balance (No—S718), eNodeB 101 may perform steps S706 to S712. Although UE 120 has a comparatively high priority to access the first network such as the E-UTRAN, eNodeB 101 may determine that network redirection is necessary when the accounting balance is less than or equal to the reference balance.

When it is determined that the accounting balance is greater than the reference balance (Yes—S718), eNodeB 101 may determine that network redirection is not necessary at step S720.

Figure 8:
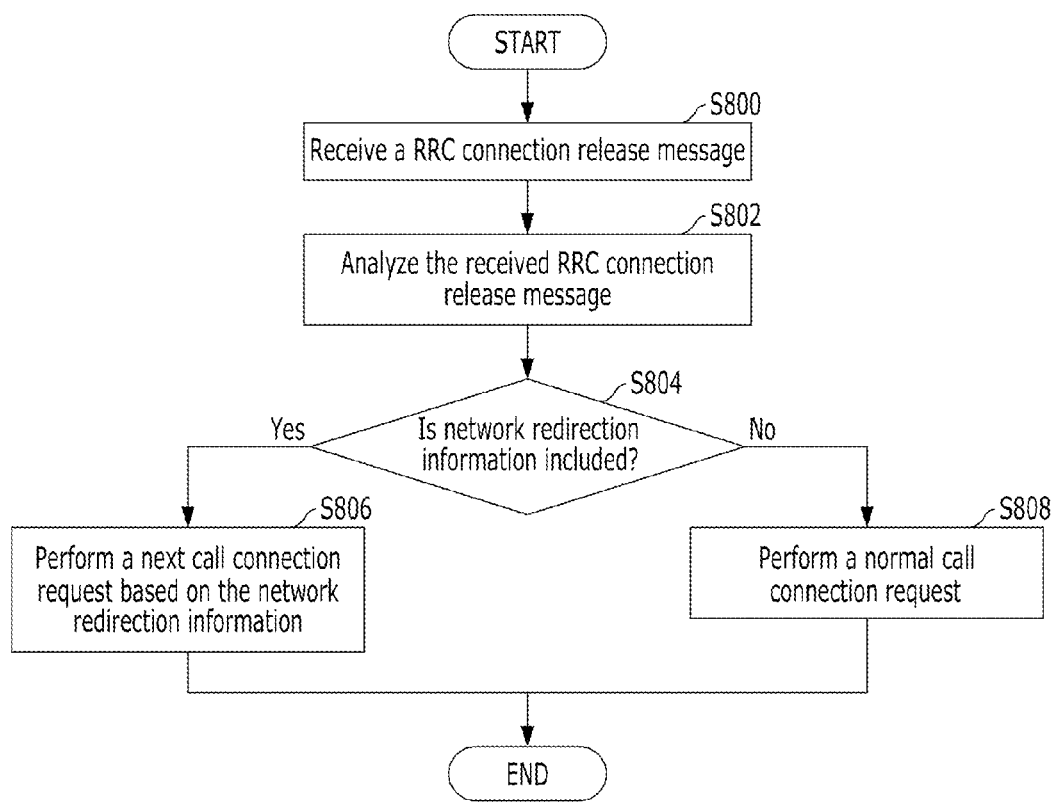
FIG. 8 illustrates establishing connection based on network redirection information in user equipment in accordance with at least one embodiment of the present invention.

FIG. 8 illustrates establishing connection based on network redirection information in user equipment in accordance with at least one embodiment of the present invention.

Referring to FIG. 8, UE 120 may receive a RRC connection release message from eNodeB 101 at step S800. The RRC connection release message may include network redirection information. For example, after a requested service is provided to UE 120, eNodeB 101 may release connection between UE 120 and a serving network such as an E-UTRAN and transmit the RRC connection release message. As described, eNodeB 101 may determine the network redirection of UE 120 based on information on the network access priority and the network load. After determination, eNodeB 101 may include the result of the network redirection in the RRC connection release message and transmit the RRC connection release message to UE 120. Accordingly, UE 120 may receive the RRC connection release message from eNodeB 101 when eNodeB 101 releases the connection between UE 120 and the current serving network.

At step S802, UE 120 may analyze the received RRC connection release message. At step S804, UE 120 may determine whether network redirection information is included in the received RRC connection release message.

When it is determined that network redirection information is included (Yes—S804), UE 120 may establish connection for a next communication service (e.g., next call connection) based on the network redirection information at step S806. For example, the network redirection information might indicate a serving network for a next communication service. When UE 120 needs a communication service, UE 120 may establish connection to the serving network indicated by the network redirection information included in the RRC connection release message.

When it is determined that network redirection information is not included (No—S804), UE 120 may perform a normal call connection request at step S808. For example, UE 120 may continuously use the current serving network as a serving network for the next communication service.

Figure 9:
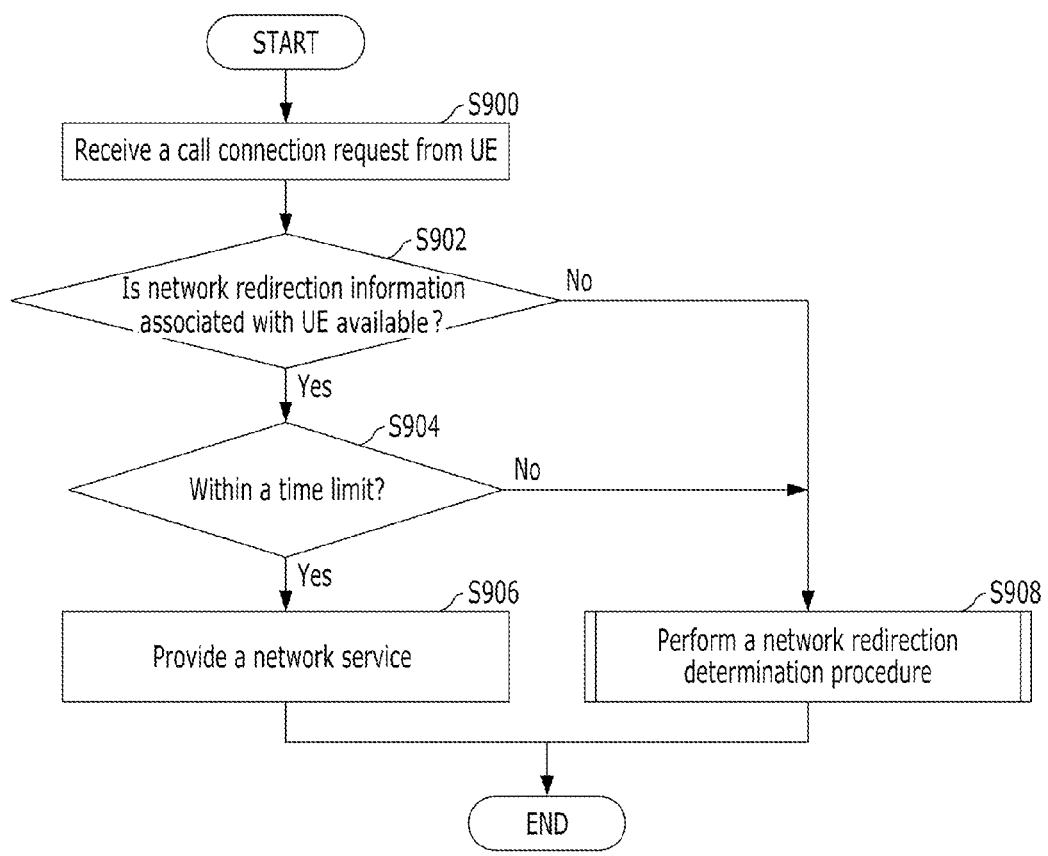
FIG. 9 illustrates providing a service to user equipment based on network redirection information in accordance with at least one embodiment of the present invention.

FIG. 9 illustrates a method for providing a service to user equipment based on network redirection information in accordance with at least one embodiment of the present invention.

UE 120 may receive a RRC connection release message including network redirection information from eNodeB 101. The network redirection information may include at least one of a next serving network such as a UTRAN, a redirection time limit, frequency allocation information in the next serving network, and frequency allocation priority information for a current serving network such as an E-UTRAN and the next serving network such as the UTRAN. For example, when the UTRAN is set as a next serving network, UE 120 may transmit a call connection request for a new network service to NodeB 111 of the UTRAN.

Referring to FIG. 9, when NodeB 111 receives a call connection request message from UE 120 at step S900, NodeB 111 may determine whether network redirection information associated with UE 120 is available at step S902. That is, NodeB 111 may determine whether the network redirection information associated with UE 120 is stored in. Furthermore, NodeB 111 may obtain network redirection information associated with UE 120 from network elements such as MME 20 and HHS 21 in a heterogeneous overlay networks.

Also, the network redirection information may be stored in at least one of related base station (BS), such as eNodeB 101 or NodeB 111, MME 20, and HSS 21. For example, when HSS 21 stores the network redirection information, NodeB 111 may receive the network redirection information from a related MME. That is, the base station (BS) such as eNodeB 101 or NodeB 111 may obtain the previously determined network redirection information in interworking with network elements such as MME 20 and HHS 21 in a heterogeneous overlay networks.

When it is determined that the network redirection information associated with UE 120 is unavailable (No—S902), NodeB 111 may perform a network redirection determination procedure at step S908. The network redirection determination procedure may be performed as shown in FIGS. 5 to 7.

When it is determined that the network redirection information associated with UE 120 is available (Yes—S902), NodeB 111 may determine whether the call connection request is within a time limit at step S904. That is, NodeB 111 may determine whether a time limit for a previously determined network redirection associated with UE 120 is expired.

When it is determined that the time limit is expired (No—S904), NodeB 111 may perform a network redirection determination procedure at step S908. Herein, the network redirection determination procedure may be performed as shown in FIGS. 5 to 7.

When it is determined that the call connection request is within the time limit (Yes—S904), NodeB 111 may provide a network service through a current serving network ("UTRAN") at step S906. That is, NodeB 111 may provide the network service through UTRAN according to the network redirection information associated with UE 120. The network redirection information may include frequency allocation information, frequency allocation priority information.

Figure 10:
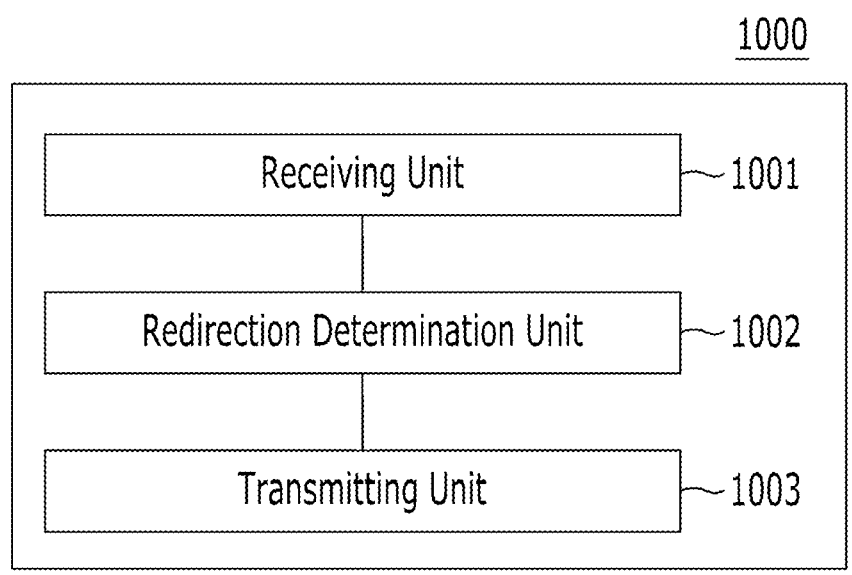
FIG. 10 illustrates an apparatus for network redirection in heterogeneous overlay networks in accordance with at least one embodiment of the present invention.

FIG. 10 illustrates an apparatus for network redirection in heterogeneous overlay networks in accordance with at least one embodiment of the present invention.

The apparatus may be illustrated as an independent apparatus in FIG. 10, but the present invention is not limited thereto. For example, the apparatus may be included in a base station such as eNodeB 101 or NodeB 111 or be implemented as at least one element of other entities in a related network, which are capable of communicating with base stations in the related network.

As illustrated in FIG. 10, apparatus 1000 may include receiving unit 1001, redirection determination unit 1002, and/or transmitting unit 1003 in accordance with embodiments of the present invention. Apparatus 1000 may perform operations descried above with reference to FIG. 5 to FIG. 9. Accordingly, the detailed descriptions thereof will be omitted herein. Each constituent element of apparatus 1000 will be briefly described.

Receiving unit 1001 may receive a call connection request from UE 120 and receive predetermined network access priority information associated with UE 120 from MME 20 and/or HSS 21.

Redirection determination unit 1002 may determine whether a network redirection is necessary based on the received predetermined network access priority information. More specifically, redirection determination unit 1002 may identify a user preferred network based on the received predetermined network access priority information associated with UE 120. Redirection determination unit 1002 may determine whether a network redirection is necessary based on the identified user preferred network. Redirection determination unit 1002 may create network redirection information when the network redirection is determined to be necessary. Furthermore, redirection determination unit 1002 may determine whether a network redirection is necessary based on at least one of a network load and accounting information. Since the operation of redirection determination unit 102 was already described with reference to FIG. 2 to FIG. 7, the detailed description thereof is omitted.

Transmitting unit 1003 may transmit the created network redirection information to UE 120. Herein, the network redirection information includes at least one of a next serving network, a redirection time limit, frequency allocation information of the next serving network, and frequency allocation priority information for the current serving network and the next serving network.

In accordance with another embodiment of the present invention, receiving unit 1001 may receive a connection request from UE 120. Redirection determination unit 1002 may provide a network service to UE 120 based on the network redirection information included in a RRC connection release message. Since such operation was already described with reference to FIG. 9, the detailed description thereof is omitted herein.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface," "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for network redirection in overlay heterogeneous networks, the method comprising:
   receiving a call connection request from user equipment;
   identifying a user preferred network based on predetermined network access priority information associated with the user equipment;
   determining network redirection based on the user preferred network; and
   creating network redirection information based on the determined network redirection,
   wherein the determining the network redirection includes:
   determining whether a current serving network is the user preferred network;
   determining whether a network load of a next serving network has not reached a first reference value when the current serving network is not the user preferred network;
   determining that performing the network redirection is necessary when the network load has not reached the first reference value; and
   determining that performing the network redirection is unnecessary when at least one of the current serving network is the user preferred network and the network load reaches the first reference value.

2. The method of claim 1, further comprising obtaining the predetermined network access priority information from a mobility management entity.

3. The method of claim 2, wherein the predetermined network access priority information is included in a subscriber profile identifier (SPID).

4. The method of claim 1, wherein the determining the network redirection comprises:
   determining that performing the network redirection is necessary when the current serving network is not the user preferred network; otherwise
   determining that performing the network redirection is unnecessary when the current serving network is the user preferred network.

5. The method of claim 1, further comprising transmitting the created network redirection information to the user equipment.

6. The method of claim 5, wherein in the transmitting, the created network redirection information is transmitted using a radio resource control (RRC) connection release message.

7. The method of claim 1, wherein the creating the network redirection information comprises:
   setting the user preferred network as the next serving network;
   setting a time limit for the determined network direction; and
   generating the network redirection information based on the next serving network and the time limit.

8. The method of claim 7, wherein, for the creating the network redirection information:
   the network redirection information further includes at least one of frequency allocation information and frequency allocation priority information;
   the frequency allocation information includes a frequency allocation for use in the next serving network and a frequency allocation priority information includes frequency allocation priority for the current serving network and the next serving network.

9. The method of claim 1, wherein the determining the network redirection further includes:
   when the current serving network is the user preferred network,
   determining whether performing the network redirection is necessary, according to at least one of (i) whether a load difference between the current serving network and the next serving network reaches a second reference value and (ii) whether an accounting balance for the current service reaches a reference balance.

10. The method of claim 1, wherein the determining the network redirection further includes:
    determining whether a load difference between the current serving network and the next serving network reaches a second reference value when the current serving network is the user preferred network;
    determining that performing the network redirection is necessary when the load difference reaches the second reference value; and
    determining that performing the network redirection is not necessary when the load difference has not reached the second reference value.

11. The method of claim 10, wherein the determining the network redirection further includes:
    determining whether an accounting balance for the current serving network reaches a reference balance when the load difference has not reached the second reference value;
    determining that performing the network redirection is necessary when the accounting balance has not reached the reference balance; and determining that performing the network redirection is unnecessary when the accounting balance reaches the reference balance.

12. A method for network redirection in overlay heterogeneous networks, the method comprising:
receiving a call connection request from user equipment;
determining availability of network redirection information associated with the user equipment; and
performing a network redirection determination procedure at least one of (i) when the network redirection information is unavailable and (ii) when the network redirection information is available and a time limit included in the network redirection information is expired,
wherein the network redirection determination procedure includes:
identifying a user preferred network based on predetermined network access priority information associated with the user equipment;
determining whether a current serving network is the user preferred network;
determining whether a network load of a next serving network has not reached a first reference value when the current serving network is not the user preferred network;
determining that performing network redirection is necessary when the network load has not reached the first reference value; and
determining that performing the network redirection is unnecessary when at least one of the current serving network is the user preferred network and the network load reaches the first reference value.

13. The method of claim 12, wherein the network redirection determination procedure further includes:
when the current serving network is the user preferred network,
determining whether performing the network redirection is necessary, according to at least one of (i) whether a load difference between the current serving network and the next serving network reaches a second reference value and (ii) whether an accounting balance for the current service reaches a reference balance.

14. A method for network redirection in overlay heterogeneous networks in user equipment, the method comprising:
receiving network redirection information from a first base station when connection between the user equipment and a current serving network is released; and
transmitting a call connection request message to a second base station for a new communication service based on the received network redirection information, wherein the received network redirection information indicates the second base station of a next serving network,
wherein the network redirection information is created through a network redirection determination procedure including:
identifying a user preferred network based on predetermined network access priority information associated with the user equipment;
determining whether the current serving network is the user preferred network;
determining whether a network load of the next serving network has not reached a first reference value when the current serving network is not the user preferred network;
determining that performing network redirection is necessary when the network load has not reached the first reference value;
determining that performing the network redirection is unnecessary when at least one of the current serving network is the user preferred network and the network load reaches the first reference value; and
creating the network redirection information based on a network redirection determination.

15. The method of claim 14, wherein the network redirection information includes at least one of the next serving network, a redirection time limit, a frequency allocation information to be used in the next serving network, and a frequency allocation priority information for each of a previous serving network and the next serving network.

16. The method of claim 14, wherein the network redirection determination procedure further includes:
when the current serving network is the user preferred network,
determining whether performing the network redirection is necessary, according to at least one of (i) whether a load difference between the current serving network and the next serving network reaches a second reference value and (ii) whether an accounting balance for the current service reaches a reference balance.

17. An apparatus for network redirection in overlay heterogeneous networks, the apparatus comprising:
a receiving unit configured to receive predetermined network access priority information associated with user equipment; and
a redirection determination unit configured to determine network redirection based on the predetermined network access priority information, and to create network redirection information based on the determined network redirection,
wherein the redirection determination unit is configured to:
identify a user preferred network based on the predetermined network access priority information;
determine whether a current serving network is the user preferred network;
determine whether a network load of a next serving network has not reached a first reference value when the current serving network is not the user preferred network;
determine that performing the network redirection is necessary when the network load has not reached the first reference value; and
determine that performing the network redirection is unnecessary when at least one of the current serving network is the user preferred network and the network load reaches the first reference value.

18. The apparatus of claim 17, further comprising:
a transmitting unit configured to transmit the created network redirection information to the user equipment.

19. The apparatus of claim 17, wherein the redirection determination unit is configured to:
when the current serving network is the user preferred network,
determine whether performing the network redirection is necessary according to at least one of (i) whether a load difference between the current serving network and the next serving network reaches a second reference value and (ii) whether an accounting balance for the current service reaches a reference balance.

20. The apparatus of claim 17, wherein the network redirection information includes at least one of the next serving network, a redirection time limit, a frequency allocation information to be used in the next serving network, and a frequency allocation priority information for each of the current serving network and the next serving network.

* * * * *